United States Patent [19]
Brock et al.

[11] Patent Number: 5,975,107
[45] Date of Patent: Nov. 2, 1999

[54] PRESSURE-BALANCING MIXING VALVE

[75] Inventors: Günter Uwe Brock, Menden, Germany; Richard Cruickshank; Shane Pinder, both of Mississauga, Canada

[73] Assignee: Friedrich Grohe AG, Hemer, Germany

[21] Appl. No.: 09/139,362

[22] Filed: Aug. 25, 1998

[30] Foreign Application Priority Data

Oct. 28, 1997 [DE] Germany ............................ 197 47 521

[51] Int. Cl.⁶ .................................................. G05D 11/03
[52] U.S. Cl. ............................................. 137/98; 137/315
[58] Field of Search ............................... 137/98, 100, 315

[56] References Cited

U.S. PATENT DOCUMENTS

| | | | |
|---|---|---|---|
| 2,145,114 | 1/1939 | Gibbs et al. | 137/100 |
| 3,688,790 | 9/1972 | Esten | 137/98 |
| 3,724,480 | 4/1973 | Povalski et al. | 137/98 |
| 4,022,242 | 5/1977 | Turecek . | |
| 5,425,394 | 6/1995 | Clare | 137/100 X |
| 5,664,598 | 9/1997 | Shieh | 137/100 |
| 5,732,729 | 3/1998 | Shieh | 137/98 X |

FOREIGN PATENT DOCUMENTS 0 322 597  7/1989  European Pat. Off. .

*Primary Examiner*—Stephen M. Hepperle
*Assistant Examiner*—John Bastianelli
*Attorney, Agent, or Firm*—Herbert Dubno

[57] ABSTRACT

A balancing valve has a housing formed with a pair of inlet ports and a pair of coaxial tubes having outer ends seated in the housing at the ports and opposite confronting and axially closed inner ends. The tubes are each formed with a radially throughgoing aperture and a flexible membrane has a center sealingly engaged between and fixed to the inner ends and an outer periphery seated in the housing and defines a respective compartment around each of the tubes. A pair of like sleeves coaxially surrounding the tubes each have an inner end fixed to the membrane offset from the center and from the outer periphery and an outer end. Formations on the outer ends of the sleeves and on the tubes form annular valve openings of flow cross sections dependent on an axial position of the sleeves relative to the tubes. The compartments communicate via the respective valve openings and apertures with the respective inlets so that, when pressure at one of the ports exceeds pressure at the other port, the sleeves will be moved axially by deforming the membrane to increase the flow cross section of the valve associated with the other port and decrease the flow cross section of the valve associated with the one port.

12 Claims, 5 Drawing Sheets

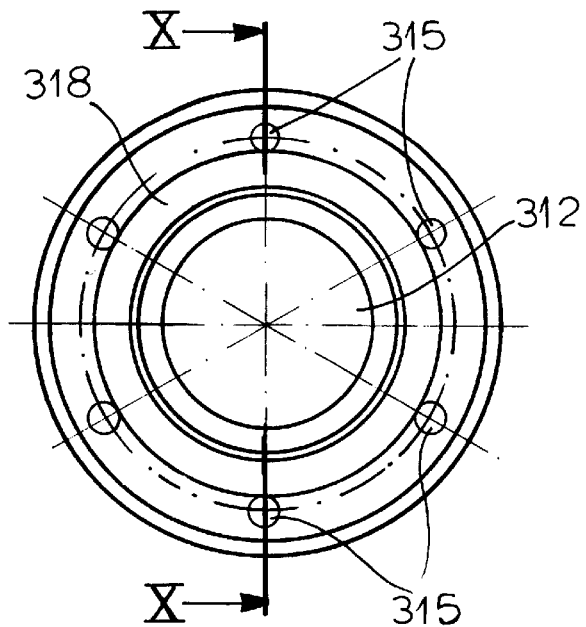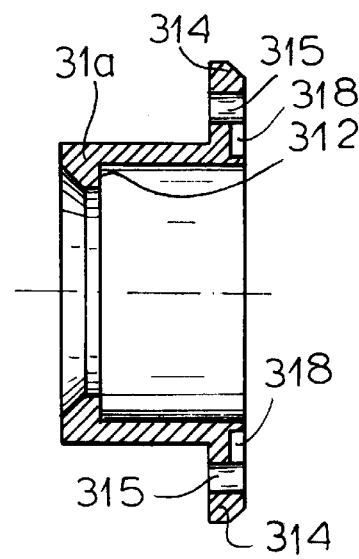
FIG.11          FIG.10
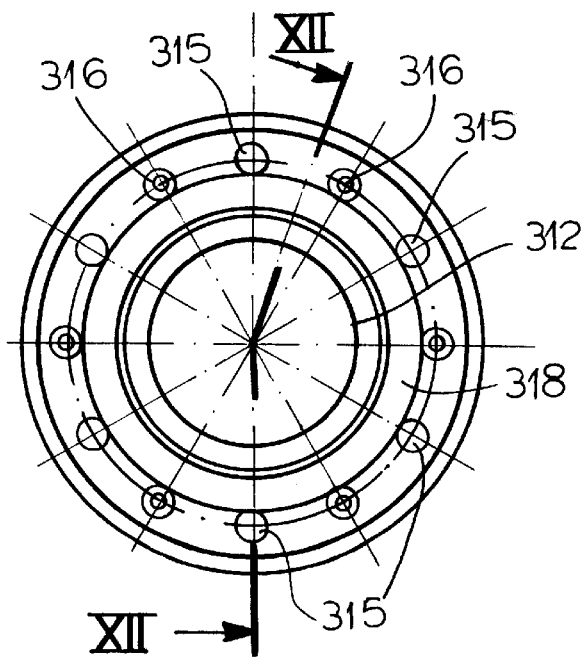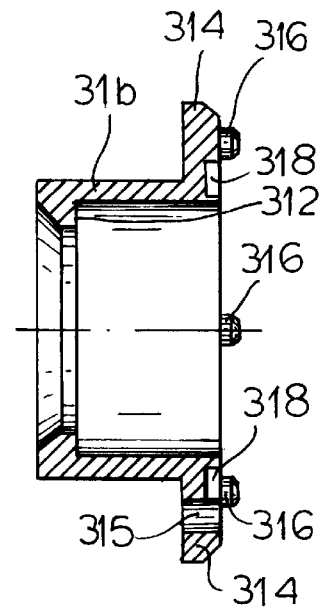
FIG.13          FIG.12

PRESSURE-BALANCING MIXING VALVE

FIELD OF THE INVENTION

The present invention relates to a valve. More particularly this invention concerns a mixing valve which automatically balances the pressures of the incoming hot and cold water sources.

BACKGROUND OF THE INVENTION

A standard pressure-balancing valve as described in U.S. Pat. No. 4,022,242 of Turecek or European 0,322,597 of Hochstrasser has a housing formed with a pair of inlet ports, a pair of coaxial tubes having outer ends seated in the housing at the ports and opposite confronting, axially engaged, and axially closed inner ends. The tubes are each formed with a radially throughgoing aperture. A flexible annular membrane has an inner periphery sealingly engaged around and the tubes and an outer periphery seated in the housing and defines a respective outlet compartment around each of the tubes. A pair of like sleeves coaxially surrounding the tubes each have an inner end fixed to the membrane offset from the center and from the outer periphery and an outer end. Formations on the outer ends of the sleeves and on the tubes form annular valve openings of flow cross sections dependent on an axial position of the sleeves relative to the tubes. The compartments communicate via the respective valve openings and apertures with the respective inlets so that, when pressure at one of the ports exceeds pressure at the other port, the sleeves will be moved axially by deforming the membrane to increase the flow cross section of the valve associated with the other port and decrease the flow cross section of the valve associated with the one port.

There is a sliding-seal joint between either the sleeves or the inner periphery of the membrane and the stationary tubes. Thus as the membrane flexes to equalize pressure in the two outlet compartments, some part slides on the tubes. This sliding must of course be allowed with minimal friction so that the valve can be as responsive as possible, and it must not allow any leakage across the joint. Thus O-rings are usually used in combination with a lubricated joint.

With time, however, the sliding action becomes stiffer and stiffer. The lubricant is washed away and the seals harden. In addition lime deposits on the surfaces make them rougher. Thus eventually the ability of the membrane to move is largely lost, along with the pressure-balancing function of the valve. The only solution is replacement of the membrane and core of the valve.

OBJECTS OF THE INVENTION

It is therefore an object of the present invention to provide an improved pressure-balancing valve.

Another object is the provision of such an improved pressure-balancing valve which overcomes the above-given disadvantages, that is which operates surely and sensitively and that has a long service life.

SUMMARY OF THE INVENTION

A balancing valve has a housing formed with a pair of inlet ports and a pair of coaxial tubes having outer ends seated in the housing at the ports and opposite confronting and axially closed inner ends. The tubes are each formed with a radially throughgoing aperture and a flexible membrane has a center sealingly engaged between and fixed to the inner ends and an outer periphery seated in the housing and defines a respective compartment around each of the tubes. A pair of like sleeves coaxially surrounding the tubes each have an inner end fixed to the membrane offset from the center and from the outer periphery and an outer end. Formations on the outer ends of the sleeves and on the tubes form annular valve openings of flow cross sections dependent on an axial position of the sleeves relative to the tubes. The compartments communicate via the respective valve openings and apertures with the respective inlets so that, when pressure at one of the ports exceeds pressure at the other port, the sleeves will be moved axially by deforming the membrane to increase the flow cross section of the valve associated with the other port and decrease the flow cross section of the valve associated with the one port.

With this system, therefore, there is no sliding action on the inlet tubes. Instead the center of the membrane is fixed between them and the sleeves are attached to the membrane at locations offset radially from this center so that these sleeves can still move axially, with flexing of the membrane, to compensate for pressure differentials. The result is a system that can be counted on to respond sensitively to pressure fluctuations and that will still have a very long service life.

According to the invention the sleeves are identical and each sleeve is formed on its inner end with an array of angularly spaced bumps extending through the membrane and joined to the bumps of the other sleeve. The bumps can be welded together. Normally the sleeves are formed of a glass-fiber reinforced plastic and the tubes are also formed of a durable plastic. Alternately each sleeve is formed on its inner end with an array of angularly spaced bumps extending into the membrane and with an array of axially throughgoing holes. The membrane also is formed with axially throughgoing holes aligned with the sleeve holes. The valve further has according to the invention bolts engaged through the sleeve and membrane holes and releasably securing the sleeves to opposite faces of the membrane.

The membrane in accordance with the invention has axially oppositely directed faces each formed with an annular seal lip engaging the respective sleeve. Furthermore the sleeves are formed with axially open annular grooves receiving the respective seal lips.

One of the tubes according to the invention is formed with an axially extending pin and the other tube is formed with an axially oppositely open seat snugly receiving the pin. This pin has a thickened cylindrical base region and the membrane is centrally formed with a circular hole tightly engaged around the base region.

The housing includes a one-piece outer housing part formed with the ports and a two-piece inner housing part engaged around the sleeves, tubes, and membrane and having seats in which the outer ends of the tubes are seated. Thus a valve core comprises of the two tubes, membrane, and two sleeves can easily be enclosed between the inner housing halves that are then fitted to the outer housing part, making servicing of the valve very simple.

BRIEF DESCRIPTION OF THE DRAWING

The above and other objects, features, and advantages will become more readily apparent from the following description, reference being made to the accompanying drawing in which:

FIG. 10 is a sectional view of one of valve-body sleeve of FIG. 9;

FIG. 11 is an end view of the sleeve of FIG. 10, line X—X indicating the section plane of FIG. 10;

FIG. 12 is a sectional view of the other valve-body sleeve of FIG. 10; and

FIG. 13 is an end view of the sleeve of FIG. 12, line XII—XII indicating the section plane of FIG. 12.

SPECIFIC DESCRIPTION

Figure 1:
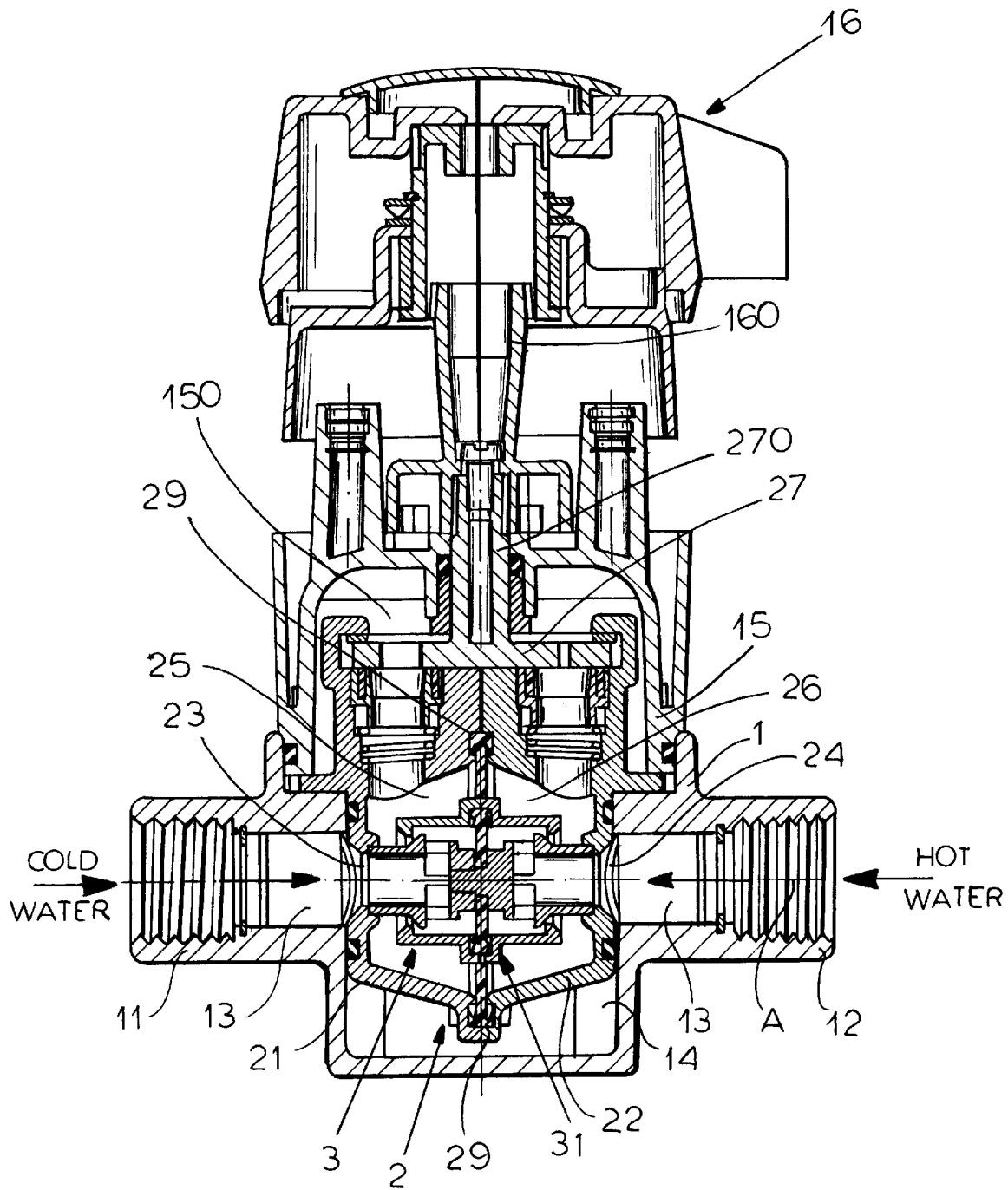
FIG. 1 is a section through the valve according to the invention

As seen in FIG. 1 a valve according to the invention has a one-piece outer housing part 1 made of metal and formed with a cold-water inlet nipple 11 and a hot-water inlet nipple 12 aligned with each other along a common axis A and each provided with a check valve 13 permitting flow into but not out of the housing part 1. An inner housing part 2 comprised of a pair of symmetrically identical halves 21 and 22 is sealed by O-rings in a chamber 14 of the outer housing part 1 and forms axially opposite inlet openings or ports 23 and 24 aligned with the respective nipples 11 and 12.

Inside the inner housing part 2 is a valve assembly 3 whose various parts are shown in more detail in FIGS. 2 through 8. A pair of similar valve tubes 32 and 33 are fitted together on opposite faces of a membrane 30 that also carries a pair of identical outer tubes or sleeves 31. The tubes 32 and 33 are formed by injection molding of a durable synthetic resin such as polysulfon (PSO) and the sleeves are also injection-molded of a glass-fiber reinforced resin such as polyphenylene ether (PPE/PS) with 20% reinforcement. The tubes 32 and 33 have flanges 34 that form seats for respective flanges or edges 312 of the sleeves 31 and both tubes 32 and 33 are formed with radially throughgoing openings 35. Thus as will be described below water can flow from the inlets 11 and 12 through the respective tubes 32 and 33 and thence into the sleeves 21 and 22 whence it can flow out between the seats 34 and edges 312 into respective output compartments 25 and 26 formed by the inner housing part 2.

Figure 2:
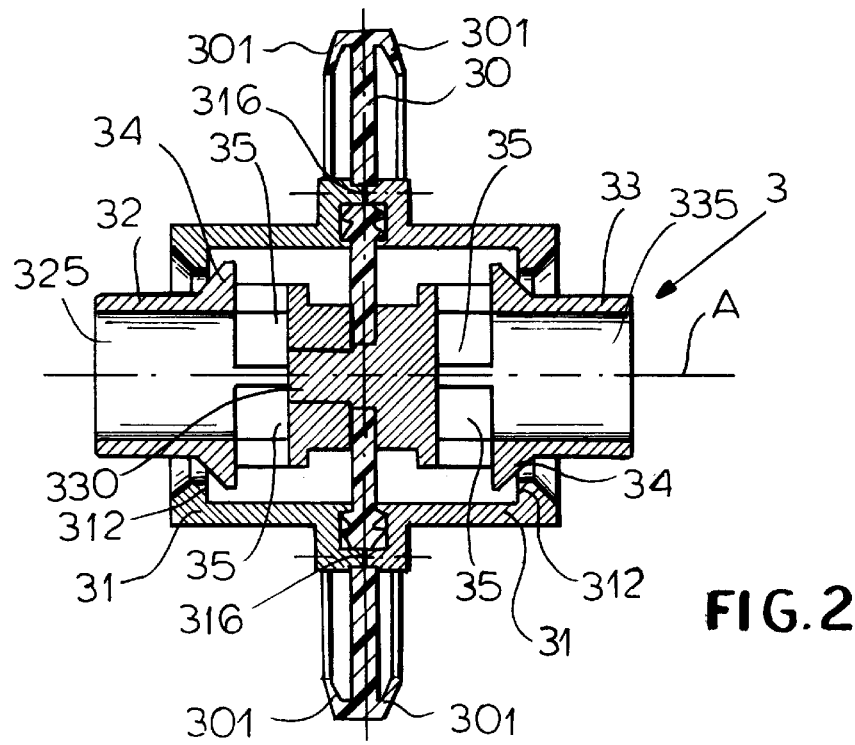
FIG. 2 is a larger-scale view of a detail of FIG. 1.
Figure 9:
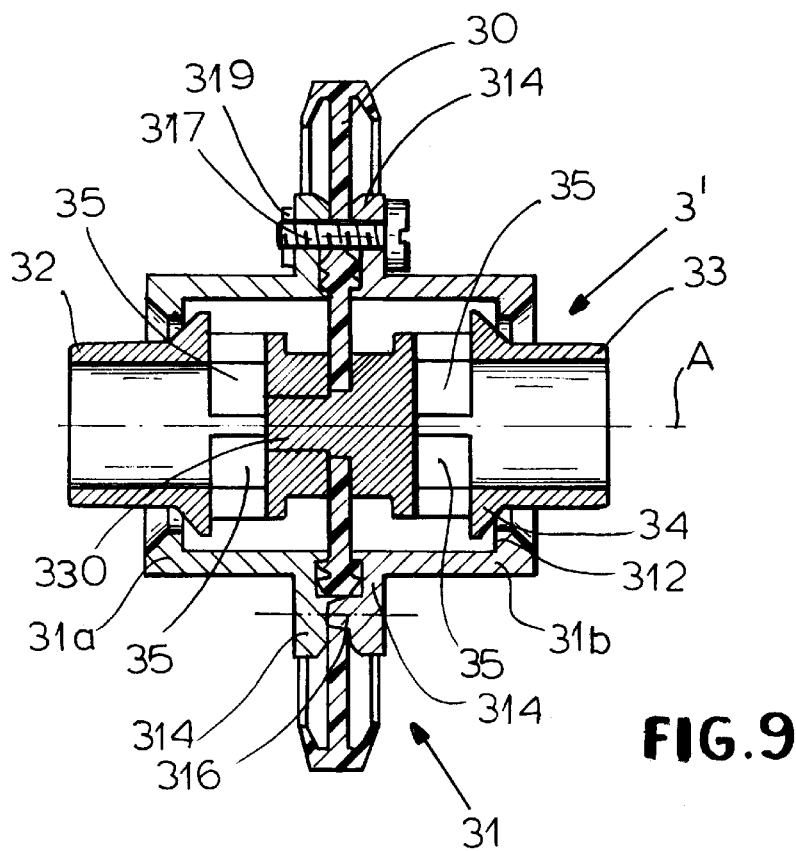
FIG. 9 is a view like FIG. 2 of an alternative valve.
Figure 4:
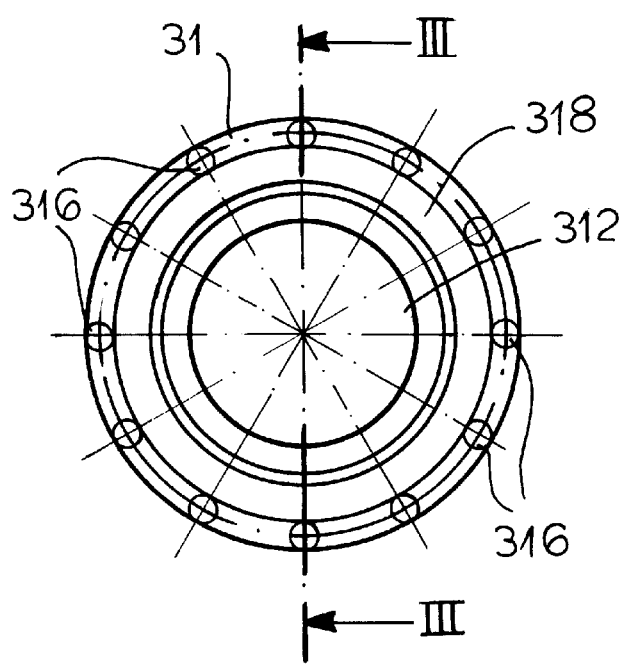
FIG. 4 is an end view of the sleeve of FIG. 3, line III—III indicating the section plane of FIG. 3.
Figure 3:
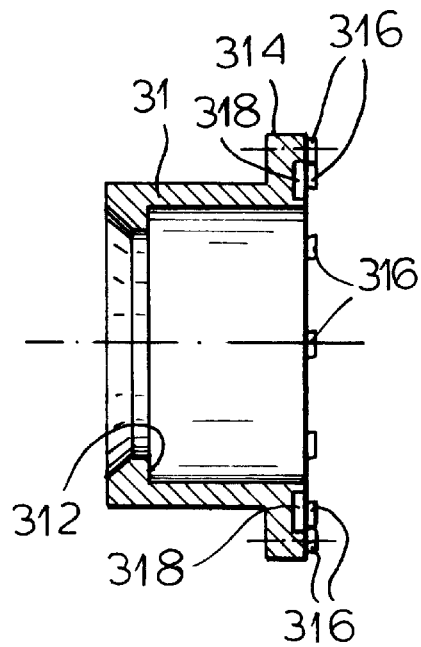
FIG. 3 is a sectional view of one of the valve-body sleeves of FIG. 2.
Figure 6:
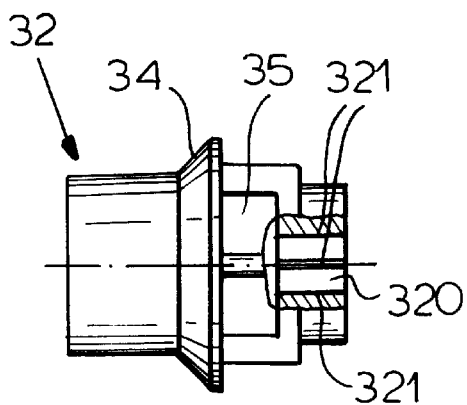
FIG. 6 is a partly sectional side view of the other of the infeed tubes of the valve.
Figure 5:
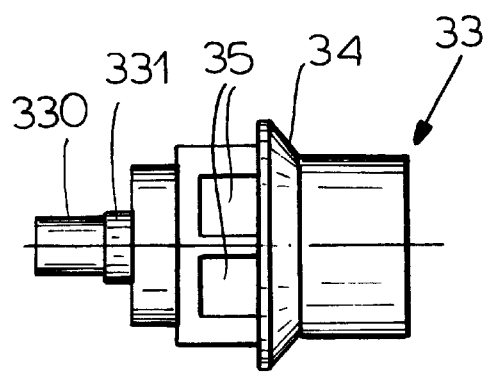
FIG. 5 is a side view of one of the infeed tubes of the valve.
Figure 7:
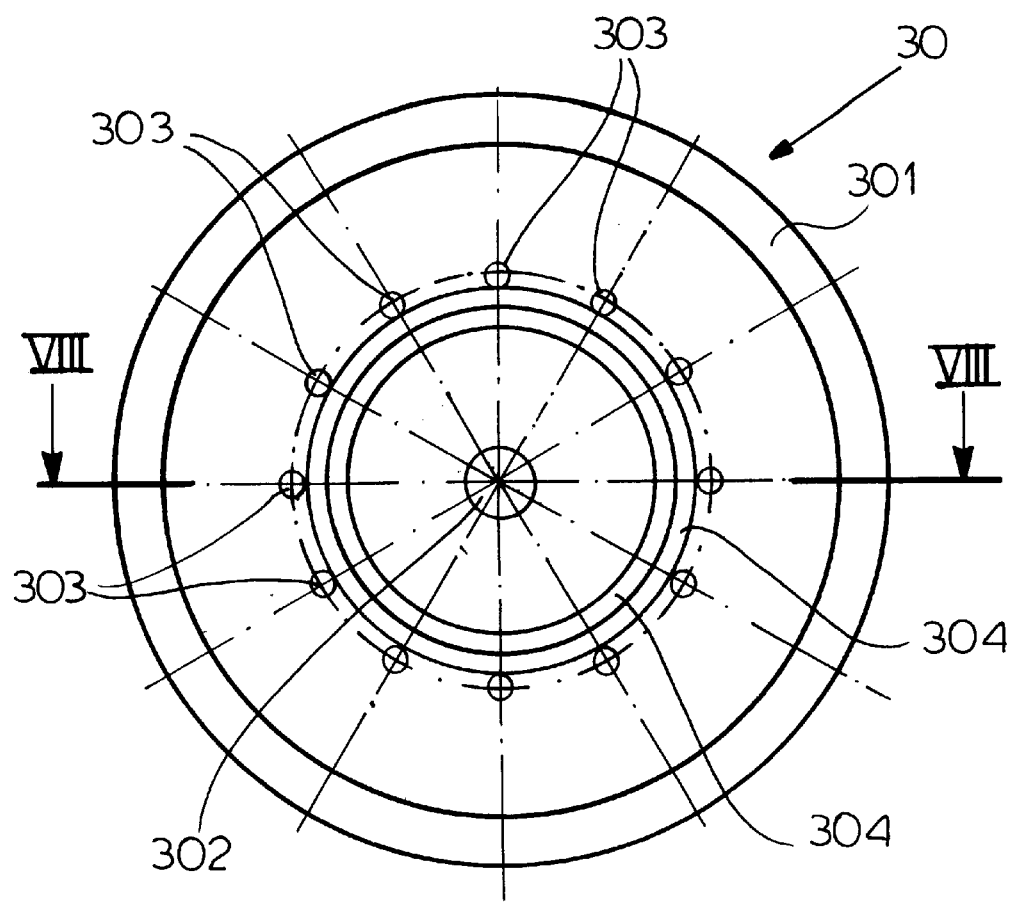
FIG. 7 is an end view of the control membrane of the valve.
Figure 8:
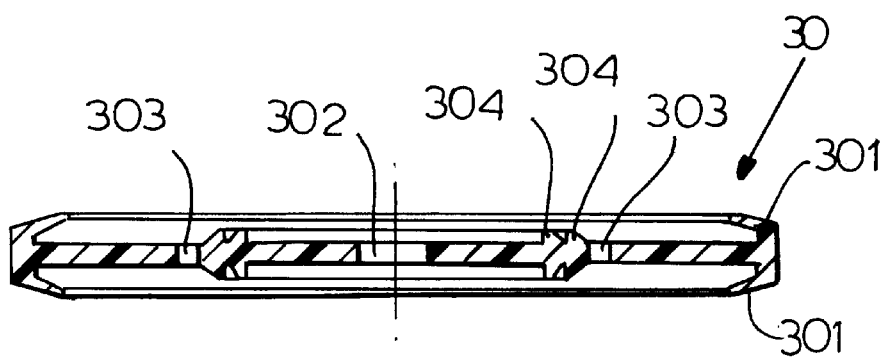
FIG. 8 is a section taken along line VIII—VIII of FIG. 7.

As best shown in FIGS. 2, 5, and 6, the valve tube 33 is formed with an axially centered and extending pin 330 adapted to fit in an axially centered hole 320 of the tube 32. The hole 320 is formed with four axially extending and radially inwardly projecting ribs 321 that are deformed when the pin 330 is forced into it to solidly join the two tubes 32 and 33 together. In addition the pin 330 has a large-diameter portion 331 that fits snugly in a hole 302 (FIG. 7) of the elastomeric membrane 30 and the axial dimension of this portion 331 is slightly less than the axial thickness of the membrane 30 around the hole 302 so that, when the two tubes 32 and 33 are fitted together on opposite sides of the membrane 30, they make a water-tight fit at the hole 302 by elastic compression of the membrane 30.

The sleeves 31 each have a flange 314 formed with an array of axially projecting and angularly equispaced short cylindrical bumps 316 that can fit in axially throughgoing holes 303 (FIGS. 7 and 8) of the membrane 30. In addition each flange 314 is formed with a square-section axially open annular groove 318 each adapted to receive a pair of annular lip seals 304 formed on the membrane 30. The outer periphery of the basically circular membrane 30 is formed with a pair of lip seals 301 that are engaged in a groove 29 formed between the housing halves 21 and 22. Thus the compartments 25 and 26 are completely separated from each other without any sliding-seal action.

This valve assembly 3 is constructed by forcing the pin 330 of the tube 33 through the hole 303 into the bore 320, thereby plastically deforming the ridges 321 and solidly lodging the pin 330 in the bore 320 and compressing the membrane 30 between the confronting ends of the tubes 32 and 33. Then the two outer sleeved 31 are fitted to opposite faces of the membrane 30, with the bumps 316 engaging in the holes 303 and the seal lips 304 fitting in the grooves 318. An ultrasonic welder is then used to join the two sleeves 31 together by fusing together the ends of the bumps 316.

In FIGS. 9 through 13 a valve assembly 3' has tubes 32 and 33 and a membrane 30 identical to those of the assembly 3. Here, however, two sleeves 31a and 31b where, instead of every other bump 316, there is a throughgoing hole 315 that allows the two flanges 314 to be secured together by four bolts 317 and nuts 319. Thus with this assembly 3' it is possible to separate the two sleeves 31a and 31b to replace the membrane 30 if necessary.

Regardless of which assembly 3 or 3' is used, it is then assembled in to the valve by pressing the two inside housing halves 21 and 22 to opposite sides of it, thereby fitting the outer ends of the tubes 32 and 33 to the openings 23 and 24 and engaging the outer rim of the membrane in the groove 29. This assembly can then be fitted down inside the one-piece outer housing part 1 to lock the entire structure together without the use of complicated fasteners.

Sitting atop the inner housing part 2 as shown in FIG. 1 is a valve disk 27 formed with a spiral slit of varying width that is aligned with the tops of the cold and hot compartments 25 and 26 and that opens upward into a mixing compartment 150 formed by an outer housing part 15 and in turn forming an unillustrated outlet. A knob 16 has a stem 160 connected to a stem 270 of the plate 27 to rotate it and change the mix of hot and cold water fed through the compartment 150 to the outlet. Thus, as is known per se, rotation of the knob 16 will vary the mix of hot and cold water fed to the outlet compartment 150 and, therefore, of the outputted water.

As long as the pressure in the cold- and hot-water lines connected to the inlets 11 and 12 is the same, the valve body 3 will assume the illustrated central position. If, for example, the pressure in the cold-water inlet 11 increases above that in the hot-water inlet 12, the increased pressure fed through the tube 32 and its apertures 35 will be applied to the left-hand (as seen in FIG. 1) face of the membrane 30 and will push the outer sleeves 31 both to the right. This action will decrease the flow cross section defined between the formations 34 and 312 of the cold-water tube 32 and increase the flow cross section defined between the formations 34 and 312 of the hot-water tube 33 and thereby equalize the pressures in the compartments 25 and 26. Obviously if the pressure inversion is the opposite, the sleeved 31 will be pushed oppositely to the left and oppositely vary the flow cross sections to similarly equalize the pressure.

We claim:

1. A balancing valve comprising:

a housing formed with a pair of inlet ports;

a pair of coaxial tubes having outer ends seated in the housing at the ports and opposite confronting and axially closed inner ends, the tubes each being formed with a radially through-going aperture;

a flexible membrane having a center sealingly engaged between and fixed to the inner ends, an outer periphery seated in the housing, and defining a respective compartment around each of the tubes;

a pair of like sleeves coaxially surrounding the tubes and each having an inner end fixed to the membrane offset from the center and from the outer periphery and an outer end;

formations on the outer ends of the sleeves and on the tubes forming annular valve openings of flow cross sections dependent on an axial position of the sleeves relative to the tubes, the compartments communicating via the respective valve openings and apertures with the respective inlets, whereby, when pressure at one of the ports exceeds pressure at the other port, the sleeves will be moved axially by deforming the membrane to increase the flow cross section of the valve associated with the other port and decrease the flow cross section of the valve associated with the one port.

2. The balancing valve defined in claim 1 wherein the sleeves are identical.

3. The balancing valve defined in claim 2 wherein each sleeve is formed on its inner end with an array of angularly spaced bumps extending through the membrane and joined to the bumps of the other sleeve.

4. The balancing valve defined in claim 3 wherein the bumps are welded together.

5. The balancing valve defined in claim 3 wherein the sleeves are formed of a glass-fiber reinforced plastic.

6. The balancing valve defined in claim 2 wherein each sleeve is formed on its inner end with an array of angularly spaced bumps extending into the membrane and with an array of axially throughgoing holes, the membrane also being formed with axially throughgoing holes aligned with the sleeve holes, the valve further comprising bolts engaged through the sleeve and membrane holes and securing the sleeves to opposite faces of the membrane.

7. The balancing valve defined in claim 1 wherein the membrane has axially oppositely directed faces each formed with an annular seal lip engaging the respective sleeve.

8. The balancing valve defined in claim 7 wherein the sleeves are formed with axially open annular grooves receiving the respective seal lips.

9. The balancing valve defined in claim 1 wherein one of the tubes is formed with an axially extending pin and the other tube is formed with an axially oppositely open seat snugly receiving the pin.

10. The balancing valve defined in claim 9 wherein the pin has a thickened cylindrical base region and the membrane is centrally formed with a circular hole tightly engaged around the base region.

11. The balancing valve defined in claim 1 wherein the tubes are formed of a durable synthetic resin.

12. The balancing valve defined in claim 11 wherein the housing includes a one-piece outer housing part formed with the ports and a two-piece inner housing part engaged around the sleeves, tubes, and membrane and having seats in which the outer ends of the tubes are seated.

* * * * *